Figure 1:
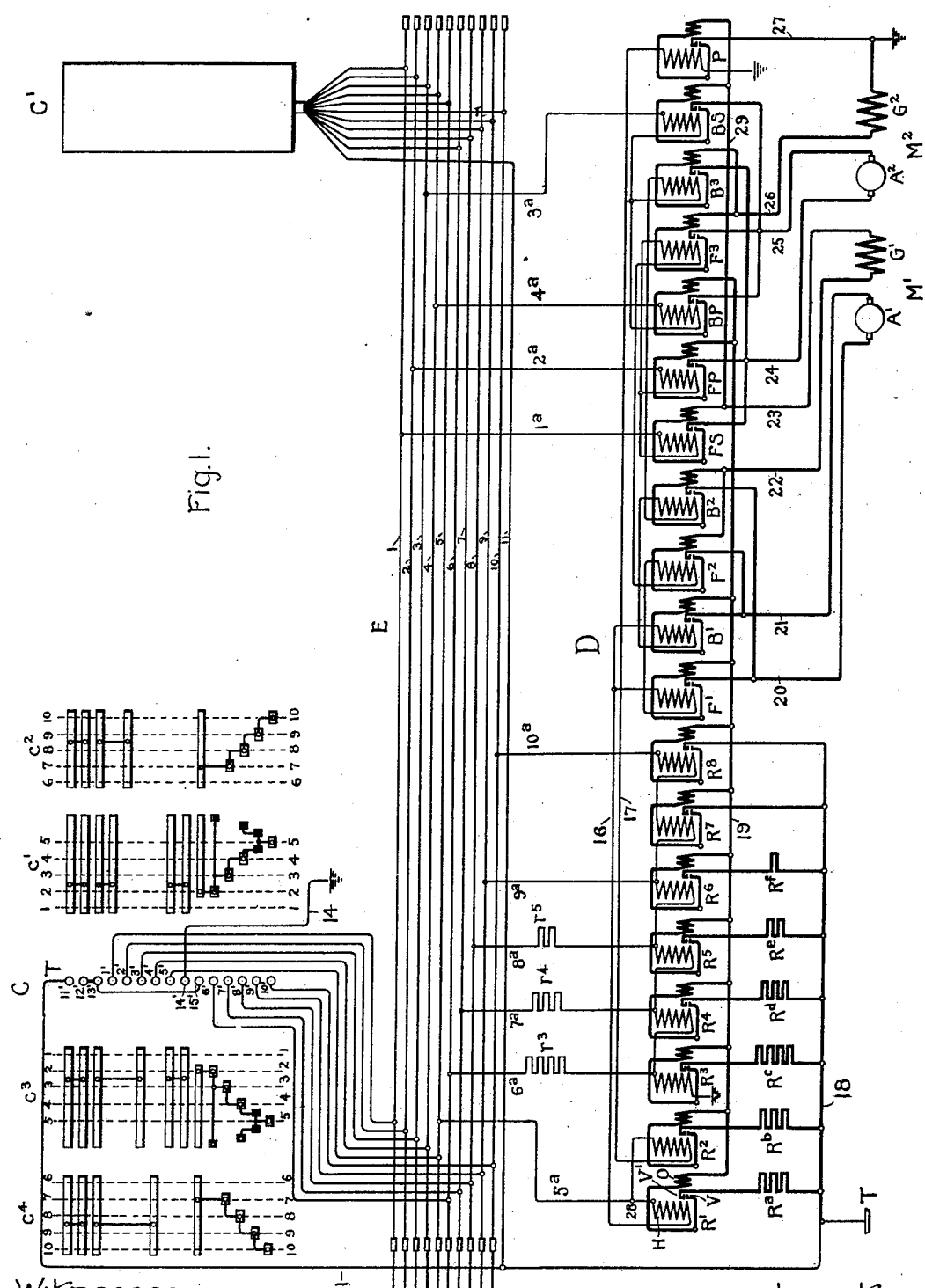

No. 716,189. Patented Dec. 16, 1902.
F. E. CASE.
MOTOR CONTROL SYSTEM.
(Application filed June 3, 1901.)

(No Model.) 2 Sheets—Sheet 1.

Witnesses. Inventor.
Frank E. Case.
by Albert G. Davis
Atty.

No. 716,189. Patented Dec. 16, 1902.
F. E. CASE.
MOTOR CONTROL SYSTEM.
(Application filed June 3, 1901.)

(No Model.) 2 Sheets—Sheet 2.

Witnesses.
John Ellis Glenn.
Benjamin B. Hull.

Inventor.
Frank E. Case.
by Albert G. Davis
Atty.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 716,189, dated December 16, 1902.

Application filed June 3, 1901. Serial No. 62,910. (No model.)

*To all whom it may concern:*

Be it known that I, FRANK E. CASE, a citizen of the United States, residing at Schenectady, county of Schenectady, State of New York, have invented certain new and useful Improvements in Motor-Control Systems, of which the following is a specification.

My invention relates to motor-control systems, and has for its main object to so organize such a system that the complete control of a motor equipment may be accomplished by a controller comprising a number of similar and independently-actuated elements.

In one of its aspects my invention consists in a motor-controller of the separately-actuated contact type, with its contacts so arranged and connected that the direction of rotation, as well as the speed of the motors, may be controlled thereby. More specifically stated, it comprises a motor-controller of the separately-actuated contact type having its contacts connected and arranged to vary the resistance in circuit with a plurality of motors (or groups of motors) and to connect the motors (or groups) either in series or in multiple with the motor-windings connected for either direction of rotation, together with suitable means for operating the controller-contacts in such a manner as will produce the desired circuit connections.

My invention also includes certain improvements in the construction of the switches which constitute the elements of the controller, as will hereinafter more fully appear.

The system constituting my present invention is a modification of the motor-control system now well known, in which the speed-control of the motors is accomplished by means of a plurality of separately-actuated contacts, the operation of which is controlled in any desired manner from a distant point. Such a system has found extensive application as a means for regulating the operation of the propelling-motors on a train comprising several motor-cars from a master-controller located at any desired point on the train; but as heretofore installed it has been necessary to provide a separate reversing-switch differing in construction from the switches constituting the elements of the main controlling-switch for reversing the connections of the motor-windings. My present invention simplifies such a system by embodying the reversing-switch and the main controlling-switch in a single group or series of similar elements. As shown in my present application, each of these separate elements is arranged to be electromagnetically actuated, the windings of the electromagnets being properly connected to a system of wiring to which the contacts of a master-controller are also connected; but evidently, so far as my present invention is concerned, the contacts may be actuated by any suitable means.

The system of the present application is in general similar to the system disclosed in Letters Patent No. 617,546, granted to Elihu Thomson. This patent, however, discloses no means for reversing the connections of the motor-windings. In the later and improved forms of this system of control it has been customary to employ a reversing-switch of the type employed in the ordinary street-car controller—namely, a cylinder provided with contacts arranged to connect the motors for either direction of rotation and to operate such a switch on each of the motor-cars of the train by means of electromagnets supplied with current from a special master reversing-switch in the master-controller. In the controller which I have devised the reversing-switch contacts are embodied in the same structure with the main controlling-switch contacts.

My invention will be better understood by reference to the following description taken in connection with the accompanying drawings.

Figure 2:
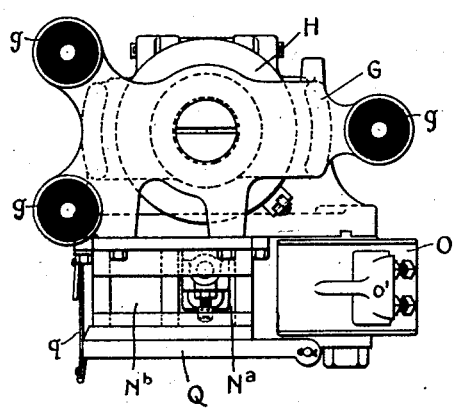
Figure 3:
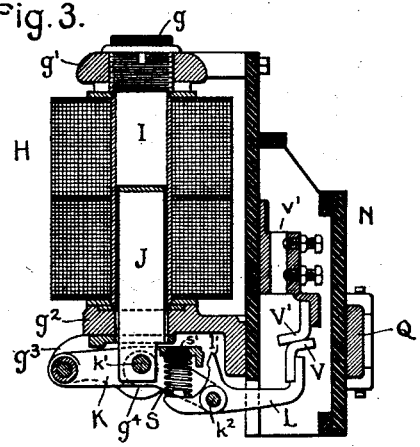
Figure 4:
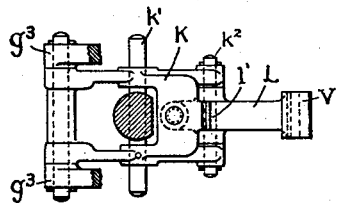

In the drawings, Figure 1 is a diagram illustrating a complete equipment for one of the motor-cars of a train provided with my improved system. Figs. 2 to 4, inclusive, illustrate the preferred construction of each of the elements of the motor-controller, and Figs. 5 and 6 are diagrams illustrating the circuit connections of the actuating-coils of the controller elements.

Referring first to Fig. 1 of the drawings, M' and M² indicate the motors constituting the motor equipment of an electrically-operated car, D indicates a controller comprising a series of electromagnetically-actuated contacts for regulating both the direction of motion and the speed of the said motors, C and C' indicate two master-controllers from either one of which current may be supplied to the actuating-windings of the various motor-controller elements, and E indicates a system of wires extending from one end to the other of the car, each wire being provided at its ends with suitable coupling devices through which it may be connected to a similar wire on the next adjacent car of the train. This system of wires is connected both to the actuating-circuits of the electromagnets which operate the motor-controller contacts and to the master-controller contacts, so that by the operation of any master-controller on the train all the motor-controllers on the various motor-cars may be simultaneously operated.

The preferred construction for each of the elements of the controller D is shown in Figs. 2 to 4, inclusive, and from these figures it will be seen that each element comprises fixed and movable contacts V and V', solenoid H for actuating the movable contact, and a coil O for furnishing a magnetic field for blowing out any arc which may be formed at the contacts. All these elements are diagrammatically indicated in the view of Fig. 1. Referring now to this figure, it will be noted that each of the separate elements of the controller D is marked with a letter or letters indicating its function. Thus the elements R' to R$^8$, inclusive, operate to regulate the resistance in circuit with the motors. The elements F', F$^2$, and F$^3$ control certain circuit connections which must be closed when it is desired to propel the car or train in one direction—say forward; the elements B', B$^2$, and B$^3$ control other circuit connections which must be closed when it is desired to operate the car or train in the reverse direction; the element P controls the operation of a contact which must be closed whenever it is desired to operate the motors in multiple, and the elements FS, BS, FP, and BP control, respectively, the operation of contacts which must be closed when it is desired to operate the train in a forward direction with the motors in series, in a reverse direction with the motors in series, in a forward direction with the motors in parallel, or in a backward direction with the motors in parallel.

Figure 5:
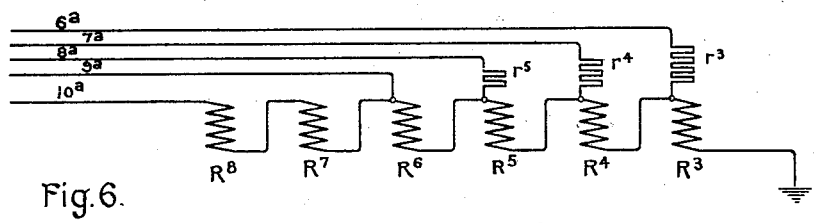
Figure 6:
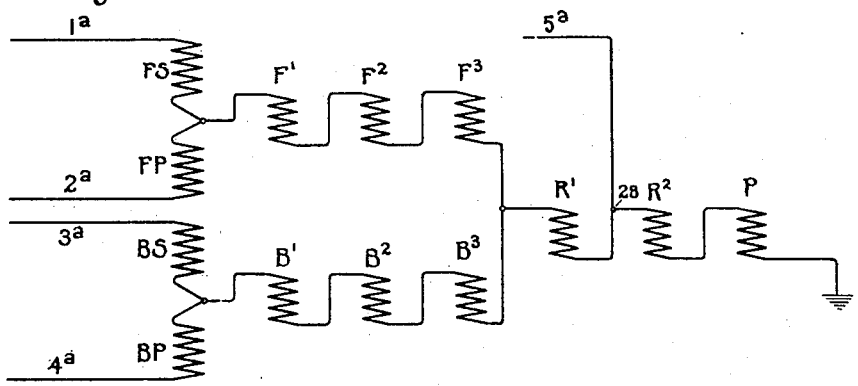

The operation of the various elements of the controller will be better understood from an inspection of the diagrams in Figs. 5 and 6, which show the actuating-coils of the controller elements, together with the same circuit connections which are shown in Fig. 1 of the drawings. From these figures it will be seen that the elements of the controller, in so far as their actuating-circuits are concerned, are divided into two independent sets, one of which operates to regulate the resistance in the motor-circuits and the other of which operates to establish any desired connections of the motor-circuits. For example, referring to Fig. 6, if current is supplied to the actuating-coils through the conductors 1$^a$ and 5$^a$ the contacts of the elements FS, F', F$^2$, F$^3$, and R' will be actuated, and these contacts will connect the two motors of Fig. 1 for forward rotation with the two motors in series. If it is desired to operate the motors still in series, but in the reverse direction, it is only necessary to supply current to the actuating-coils of Fig. 6 through the conductors 3$^a$ and 5$^a$, in which case the elements BS B' B$^2$ B$^3$ will be actuated in place of the corresponding elements for forward rotation. If it is desired to operate the motors in multiple with their windings connected for forward rotation, current is supplied through the conductor 2$^a$, the other terminal of the supply-circuit being connected to ground. The elements FP, F', F$^2$, F$^3$, R', R$^2$, and P will then be actuated, and if it is desired to connect the motors for reverse rotation, with their windings in multiple, current must be supplied through the conductor 4$^a$, the other terminal of the supply-circuit being connected to ground. In this case the elements BP, B', B$^2$, B$^3$, R', R$^2$, and P will be actuated. From the above description it will be noted that the windings of the electromagnets which actuate the contacts to connect the motors either in series or in multiple for either direction of rotation are connected in an electric circuit branching at both ends. Whenever any desired motor connections have been made either for forward or backward rotation, with the motors in series or in multiple, the resistance in the motor-circuit may be gradually reduced and finally cut out by actuating the elements R$^3$ to R$^8$, inclusive, of the controller through the conductors 6$^a$ to 10$^a$ and to ground.

The operation of the system as a whole will now be understood from an inspection of Fig. 1. In this figure the master-controller C at the left is shown with its contacts developed on a plane surface, as is customary in illustrating such structures, although in actual construction the rectangular contacts of the series $c'$, $c^2$, $c^3$, and $c^4$ are commonly mounted upon the surface of a cylinder (or cylinders) and are arranged to be rotated past a set of fixed brushes, (indicated by the small circles 1' to 15'.) In the particular arrangement illustrated in the drawings the rectangular contacts on the right operate to connect the motors for forward rotation first in series and then in multiple, while the rectangular contacts on the left operate to connect the motors for reverse rotation in a similar manner. In order that the operation of the system may be understood, let it be supposed that the master-controller C has been moved into such a position that the contacts 1' to 15', inclusive, lie along the line 1 1 on the rectangular contacts of the range $c'$. A circuit may then be traced as follows through the actuating-coils of the controller D: Starting from trolley-conductor T, the circuit leads through contacts 11' and 12' and the corresponding cross-connected rectangular contacts to contact 13', thence by way of cross-connected rectangular contacts to contact 1', and through train-conductor 1 to conductor $1^a$ on the particular car on which the master-controller is located, and to a corresponding conductor on all of the other motor-cars on the train, if there be a plurality of such cars. From the conductor $1^a$ the circuit continues, as indicated in Fig. 6 of the drawings, through the actuating-coils of the elements FS, $F^3$, $F^2$, F', and R' to point 28, where the circuit divides, one branch leading through the actuating-coils of elements $R^2$ and P to ground and the other branch leading directly to ground through conductor $5^a$, train-conductor 5, and contacts 5' and 14' of the master-controller. The branch direct to ground through the contacts of the master-controller short-circuits the actuating-coils of the elements $R^2$ and P, and thus prevents their operation. With the elements above specified in operation the motor-circuits may be traced as follows: Starting from trolley T, the circuit leads through resistance-section $R^a$ and through the contacts of the controller element R' to conductor 19, thence through the contacts of the element F' to conductor 20 and through the armature A' of the motor M' to conductor 21, through the contacts of the element $F^2$ to conductor 22 and through the field-winding G' of the motor M' to conductor 23, thence through the contacts of the element FS to conductor 24, through the armature $A^2$ of the motor $M^2$ to conductor 25, through the contacts of the element $F^3$ to conductor 26, and through the field-winding $G^2$ of the motor $M^2$ to ground. A further movement of the master-controller through the positions 2 2, 3 3, 4 4, and 5 5 on the contacts c' operates to cut in one after another the resistance-sections $R^c$, $R^d$, $R^e$ and $R^f$ in multiple with the resistance-section $R^a$ and finally to short-circuit all the resistances by the operation of the controller elements $R^7$ and $R^8$. Further movement of the master-controller in the same direction until the contacts 1' to 15', inclusive, lie along the line 6 6 of the range of contacts $c^2$ operates to connect the motors in multiple for forward rotation, with a maximum resistance in circuit therewith. For this position of the master-controller a circuit may be traced, starting from the trolley-conductor T, through contacts 11' and 12' and the cross-connected rectangular contacts, as before, to contact 13', thence through cross-connected rectangular contacts of the range $c^2$ to conductor 2' and train-conductor 2, thence through conductor $2^a$ to the actuating-winding of the controller element FP, thence through the actuating-windings of the elements F', $F^2$, $F^3$ and R' to the point 28 and through the actuating-windings of the elements $R^2$ and P to ground, the branch circuit through the conductor $5^a$ being no longer completed through the contacts of the master-controller. For this first multiple position of the master-controller the motor-circuits may be traced as follows: Starting from trolley T the circuit leads through resistance-sections $R^a$ and $R^b$ to the contacts of the controller elements R' and $R^2$ and thence to conductor 19, the two resistances being connected in multiple in the first multiple position of the controller in order to furnish the increased carrying capacity which is required by the multiple connection. From the conductor 19 one circuit leads through the contacts of the element F' to the conductor 20 and through the armature A' of the motor M' to the conductor 21, thence through the contacts of the element $F^2$ to the conductor 22 and the field-winding G' of the motor M', and thence through conductors 23 and 29 and the contacts of the element P to the conductor 27 and to ground. From the conductor 19 the circuit of the other motor leads through the contacts of the element FP to the conductor 24, and thence through the armature $A^2$ of the motor $M^2$ to the conductor 25 and through the contacts of the element $F^3$ to conductor 26, and thence through the field-winding $G^2$ of the motor $M^2$ to ground. Further movement of the master-controller through the positions 7 7 to 10 10, inclusive, operates merely to reduce the resistance in the motor-circuit and finally to short-circuit the entire resistance, as before. The operation of the master-controller in case the controller-cylinder is rotated in such a direction as to bring the ranges of contacts $c^3$ and $c^4$ into engagement with the fixed contacts 1' to 15', inclusive, is the same as in the positions already described, except that one or the other of the elements BS and BP and the elements B', $B^2$, and $B^3$ are operated in place of the corresponding elements FS or FP and F', $F^2$, and $F^3$, thus reversing the direction of current-flow through each of the motor-armatures.

It will be noted that the actuating-coils which control the operation of the contacts which cut the resistance-sections $R^c$ to $R^f$, inclusive, into circuit and finally short-circuit all of the resistances are connected in series in a single circuit, so that in the full-multiple or full-series position all of these coils are energized in a circuit connected between the conductor $10^a$ and ground. These different contacts are actuated one after the other through the circuits $6^a$ to $9^a$, inclusive, the first circuit containing a resistance $r^3$, calculated to permit the same flow of current in the actuating-coil of the element $R^3$ as would flow therein in the final position in which all of the coils are connected in series across the terminals of the source of supply. At the next step, when it is desired that the two elements $R^4$ and $R^3$ shall be actuated, the circuit is completed through the conductor $7^a$, the smaller resistance $r^4$, and the two actuating-coils. When it is desired that three elements shall be actuated, the corresponding actuating-coils are connected in circuit with a still smaller resistance $r^5$ through the conductor $8^a$. No resistance is inserted in the circuit with the conductor $9^a$. This arrangement of the actuating-circuits is not my invention and is illustrated herein only because I desire to show a complete working system.

The construction of the several elements of the controller is substantially the same as that described and claimed in my application, Serial No. 671,994, filed February, 1898. The construction which I have shown in Figs. 3 to 4, inclusive, embodies, however, certain improvements which I desire to claim in the present application. Referring to these figures, G is a framework supporting between its heads $g'$ and $g^2$ a solenoid-coil H, wound in two sections. The upper head $g'$ carries a core I of magnetic material extending part way into the coil H. A movable member K is pivotally mounted on lugs $g^3$, projecting from the lower portion of the framework, and this member is operatively connected to a core J, which, together with the coil H, constitutes the means for actuating the switch-contacts. The core J is surrounded by a casing of non-magnetic material, and a disk of non-magnetic material is interposed between the ends of the cores J and I to prevent sticking. The member K is provided with a contact-carrying member L, pivotally mounted on the end of the member K opposite its pivot. This member L has an extension $l'$, which serves to limit the relative movement between the members K and L. At a point removed from the pivot on which the member L is mounted a spring S is interposed between the ends of the members K and L, this spring tending normally to keep the extension $l'$ in engagement with the end of the member K, but permitting the contact V, mounted on the end of the member L, to make a wiping or sliding engagement with the fixed contact V', both when the contacts are brought into engagement and when they are separated. The contact V' is mounted on a suitable terminal supported on an insulating-board fastened to one side of the framework G, and both of the contacts are surrounded by an insulating-chute N, having two compartments $N^a$ and $N^b$, which are closed at the front by the insulated pole-piece Q of the blow-out magnet O, the pole-piece of the blow-out magnet being normally held in the closed position shown in Fig. 2 of the drawings by the spring-catch $q$. The switch-contacts are so mounted that their contacting surfaces engage in a plane substantially at right angles to the direction of motion of the member carrying the movable contacts. This construction is substantially the same as that shown in my prior application above referred to, except for the construction of the member carrying the movable contact V and the circuit connections thereto. The construction of the member carrying the movable contact in two parts pivoted to one another and having a spring connection between them I have found to be an improvement over the construction shown in my prior application, and with such a construction I have found it possible to use the framework, together with the parts pivoted thereon, as a part of the electrical circuit. The terminal connections for the motor-circuits are made at the connectors $o'$ and $v'$, one of which is connected to the winding of the blow-out coil and the other of which is mounted on an insulating-support in the arcing-chute. Starting from the terminal connection of the blow-out coil at $o'$ the circuit leads through the winding of said coil to the core upon which said winding is mounted, and thence through the frame G, and the pivots upon which the member K is hung, to the body of the said member K and through the pivot connection $k^2$ to the body of the member L, and thence through the contacts V and V', when they are in engagement, to the terminal connector $v'$. In order to illustrate the castings on which the controller elements are built up from each other, I provide the holes through which the supporting-bolts are passed with insulating-bushings $g$. Also in order to prevent current from flowing through the spring S, which would have the effect of taking the temper out of it, I provide a body of insulation at one end interposed between the end of the spring and one of the members by means of which the movable contact is actuated, this insulating-body being shown at $s'$ in Fig. 3. When the coil H is deënergized, the spring S operates to keep the contacts V and V' in engagement until the core J has acquired considerable momentum, and thus the contacts are separated quickly instead of being slowly drawn apart. The limit to which the core J can fall when the contacts V and V' are out of engagement is determined by the ends of the pivot-pin $k'$, which engage the lower edges of holes $g^4$, bored out in the lugs $g^3$ on either side of the member K.

In the operation of the system herein described it will of course be advisable to make use of the safety devices ordinarily employed for preventing the operation of any set of controller-contacts at an improper time. Such safety devices are shown in my prior application above referred to; but since they have nothing to do with the invention of the present application I have not deemed it necessary to illustrate them herein.

What I claim as new, and desire to secure by Letters Patent of the United States, is—

1. A motor-controller consisting of a group of independent elements arranged to control both the direction of rotation and the speed of one or more motors, each of said elements comprising a single set of contacts connected to the motor-circuit and means for actuating the same.

2. A motor-controller consisting of a group of independent elements arranged to control both the direction of rotation and the speed of one or more motors, each of said elements comprising a single set of contacts connected to the motor-circuit and means for actuating the same, and a master-controller for operating said elements in any desired combination.

3. A motor-controller consisting of a group of independent elements arranged to control both the direction of rotation and the speed of one or more motors, each of said elements comprising a single set of contacts and an electromagnet for actuating the same, and a master-controller for controlling the operation of said electromagnets.

4. A motor-controller consisting of a group of independent elements arrranged to control the direction of rotation of a plurality of motors and to connect them in series or in multiple, each of said elements comprising a single set of contacts connected to the motor-circuits and means for actuating the same.

5. A motor-controller consisting of a group of independent elements arranged to control the direction of rotation of a plurality of motors and to connect them in series or in multiple, each of said elements comprising a single set of contacts connected to the motor-circuits and means for actuating the same, and a master-controller for operating said elements in any desired combination.

6. A series-multiple controller comprising a group of separately-actuated contacts, electromagnets for actuating said contacts, and electrical connections between the windings of said electromagnets, the said connections being so arranged that the closing of a single circuit through the said windings will cause contacts to be actuated to connect the motors either in series or in multiple with the motor-windings connected for either direction of rotation.

7. A series-multiple controller comprising a group of separate electromagnetically-actuated contacts, the windings of the said electromagnets being connected in an electric circuit branching at both ends, and a master-controller for connecting the said branching ends to the opposite terminals of a source of current-supply in different combinations to connect the motors either in series or in multiple with the motor-windings connected for either direction of rotation.

8. A motor-controller comprising a series of separately-actuated contacts connected and arranged to vary the resistance in circuit with the motors and to connect the motors either in series or in multiple with the motor-windings connected for either direction of rotation.

9. In combination in a motor-controller, a plurality of separately-actuated contacts arranged to connect the motors either in series or in multiple with the motor-windings connected for either direction of rotation, actuating means for said contacts, and a master-controller constructed and arranged to secure the operation of said actuating means in any one of four different sets, one set operating to connect the motors in series for forward movement, another to connect the motors in series for backward movement, another to connect the motors in multiple for forward movement, and the other to connect the motors in multiple for backward movement.

10. In combination in a motor-controller, a plurality of separately-actuated contacts arranged to connect the motors either in series or in multiple with the motor-windings connected for either direction of rotation, electromagnets for operating said contacts, and a master-controller constructed and arranged to connect the windings of said electromagnets to a suitable source of supply in any one of four different sets, one set operating to connect the motors in series for forward movement, another to connect the motors in series for backward movement, another to connect the motors in multiple for forward movement, and the other to connect the motors in multiple for backward movement.

11. In combination in a motor-controller, a plurality of separately-actuated contacts arranged to connect the motors either in series or in multiple with the motor-windings connected for either direction of rotation, separate electromagnets for operating each of said contacts, the windings of all of said electromagnets being electrically connected, and a master-controller having its contacts arranged to close four separate and distinct circuits through said electrically-connected magnet-windings, the closing of one circuit operating to actuate contacts to connect the motors in series for forward movement, the closing of another to connect the motors in series for backward movement, the closing of another to connect the motors in multiple for forward movement, and the closing of the other to connect the motors in multiple for backward movement.

12. In combination in a switch, a movable member, actuating means therefor, a contact-carrying member pivoted on said movable member, a spring interposed between said members, a contact mounted on said pivoted member, and a fixed member having its contacting surface substantially at right angles to the direction of motion of said movable member.

13. In a switch, a fixed contact, a movable contact adapted to engage therewith, the contacting surfaces of the said contacts being arranged to engage in a plane substantially at right angles to the direction of motion of the said movable contact, a switch-actuating member, a second member carrying said movable contact and pivoted on the actuating member, and a spring interposed between said members.

14. In a switch, a fixed contact, a movable contact adapted to engage therewith, the contacting surfaces of the said contacts being arranged to engage in a plane substantially at right angles to the direction of motion of the said movable contact, a switch-actuating member, a second member, carrying said movable contact and pivoted on the actuating member, both of said members being adapted to constitute a portion of the electrical circuit including said contacts, a spring interposed between said members, and insulating means for preventing the flow of current through said spring.

15. In a switch, a fixed contact, a movable contact adapted to make a wiping or sliding contact therewith, the contacting surfaces of the said contacts being arranged to engage in a plane substantially at right angles to the direction of motion of the said movable contact, a switch-actuating member, a second member carrying said movable contact and pivoted on the actuating member, a spring interposed between said members for the purpose of permitting a wiping or sliding connection between said contacts, and means for limiting the relative movement between the said members due to the spring.

16. In an electromagnetically-actuated switch, an actuating winding constituting a solenoid, a core therefor, a switch-actuating member connected to said core, a contact-carrying member pivoted on said actuating member, a contact carried thereby, a fixed contact, the contacting surfaces of the said contacts being arranged to engage in a plane substantially at right angles to the direction of motion of the said movable contact, and a spring mounted between said members so as to give a resilient mounting for one of the contacts.

17. A controller for heavy currents comprising a plurality of separately-actuated switches each switch comprising a fixed contact, a movable contact adapted to engage therewith, the contacting surfaces of the said contacts being arranged to engage in a plane substantially at right angles to the direction of motion of the said movable contact, a switch-actuating member, a second member carrying said movable contact and pivoted on the actuating member, and a spring interposed between said members.

In witness whereof I have hereunto set my hand this 31st day of May, 1901.

FRANK E. CASE.

Witnesses:
BENJAMIN B. HULL,
MARGARET E. WOOLLEY.